US011588239B2

(12) United States Patent
Scott et al.

(10) Patent No.: US 11,588,239 B2
(45) Date of Patent: Feb. 21, 2023

(54) APPARATUS AND METHOD FOR PROVIDING PROBABILISTIC ADDITIVE GAIN, CALIBRATION, AND LINEARIZATION IN A PHASED ARRAY USING SINGLE BIT SOURCES

(71) Applicant: Epirus, Inc., Hawthorne, CA (US)

(72) Inventors: Alex Scott, El Segundo, CA (US); Harry B. Marr, El Segundo, CA (US); Michael Borisov, El Segundo, CA (US); Jason Chaves, El Segundo, CA (US); Nathan Mintz, El Segundo, CA (US); Yiu Man So, El Segundo, CA (US); Daniel G. Thompson, El Segundo, CA (US); William Dower, El Segundo, CA (US)

(73) Assignee: EPIRUS, INC., Hawthorne, CA (US)

( * ) Notice: Subject to any disclaimer, the term of this patent is extended or adjusted under 35 U.S.C. 154(b) by 0 days.

(21) Appl. No.: 17/510,086

(22) Filed: Oct. 25, 2021

(65) Prior Publication Data
US 2022/0045423 A1 Feb. 10, 2022

Related U.S. Application Data

(63) Continuation of application No. 16/995,696, filed on Aug. 17, 2020, now Pat. No. 11,158,942.

(60) Provisional application No. 62/910,235, filed on Oct. 3, 2019.

(51) Int. Cl.
*H01Q 3/30* (2006.01)
*H04B 7/06* (2006.01)

(52) U.S. Cl.
CPC ............. *H01Q 3/30* (2013.01); *H04B 7/0617* (2013.01)

(58) Field of Classification Search
CPC .... H03M 1/001; H03M 1/361; H03M 7/3008; H03M 7/3028; H04B 10/2507; H04B 10/61; H04B 1/12; G01R 19/2509; H04L 7/00; H04L 7/0087
See application file for complete search history.

(56) References Cited

U.S. PATENT DOCUMENTS

| 5,818,376 A | 10/1998 | Bianchessi |
| 6,448,921 B1 * | 9/2002 | Tsui ........................ G01S 7/021 342/13 |
| 7,283,793 B1 | 10/2007 | McKay |
| 8,401,108 B1 | 3/2013 | Haddadin |

(Continued)

OTHER PUBLICATIONS

Antonik, et al., "Range-dependent beamforming using element level waveform diversity," 2006 International Waveform Diversity & Design Conference, 2006, pp. 1-6, doi: 10.1109/WDD.2006.8321488.

(Continued)

*Primary Examiner* — Khanh C Tran
(74) *Attorney, Agent, or Firm* — Knobbe, Martens, Olson & Bear LLP

(57) ABSTRACT

An array of antennae includes a monobit transmitter to insert dither into a transmit signal to form a dithered transmit signal. Monobit receivers process received signals that are combined with the dithered transmit signal to form composite received signals. Digital down converters process the composite received signals to form down converted received signals. A beamformer circuit processes the down converted received signals to form recovered signals.

20 Claims, 6 Drawing Sheets

(56) References Cited

U.S. PATENT DOCUMENTS

| | | | |
|---|---|---|---|
| 9,998,275 B1* | 6/2018 | Pritsker | H04B 1/12 |
| 10,020,968 B1 | 7/2018 | Rodenbeck | |
| 10,700,700 B1 | 6/2020 | Shamee | |
| 2013/0216010 A1 | 8/2013 | Savage | |
| 2019/0067814 A1* | 2/2019 | Thompson | G01S 13/0209 |
| 2020/0304210 A1 | 9/2020 | Shamee | |

OTHER PUBLICATIONS

Aumann, et al., "Phased array antenna calibration and pattern prediction using mutual coupling measurements," IEEE Transactions on Antennas and Propagation 37(7):844-850 (1989).

Fulton, et al., "Calibration techniques for digital phased arrays," 2009 IEEE International Conference on Microwaves, Communications, Antennas and Electronics Systems, Tel Aviv, pp. 1-10 (2009).

Fulton, et al., "Calibration of a digital phased array for polarimetric radar," 2010 IEEE MTT-S International Microwave Symposium, Anaheim, CA, pp. 161-164 (2010).

Hassett, "Phased Array Antenna Calibration Measurement Techniques and Methods," EuCAP 2016.

Host, et al., "Digital array planar near-field calibration using element plane wave spectra with iterative search," 2018 United States National Committee of URSI National Radio Science Meeting (USNC-URSI NRSM), Boulder, CO, pp. 1-2 (2018).

Long, et al., "Fast amplitude-only measurement method for phased array calibration," IEEE Transactions on Antennas and Propagation 65(4):1815-1822 (2017).

Longbrake, et al., "Wideband phased array calibration method for digital beamforming," IEEE National Aerospace and Electronics Conference (NAECON), pp. 11-17 (2012).

Mano, et al., A method for measuring amplitude and phase of each radiating element of a phased array antenna, Electronics and Communications in Japan 65-B(5):58-64 (1982).

Medina, et al, "Calibration and validation of the CASA phased array antenna," 2012 9th European Radar Conference, Amsterdam, pp. 614-617 (2012).

Mitchell Adam, "Coupling-based wideband digital phased array calibration techniques," Master's thesis, University of Oklahoma (2014).

Shipley, et al., "Mutual coupling-based calibration of phased array antennas," Proceedings 2000 IEEE International Conference on Phased Array Systems and Technology (Cat. No. 00TH8510), Dana Point, CA, pp. 529-532 (2000).

Takahashi, et al, "Fast Measurement Technique for Phased Array Calibration," IEEE Transactions on Antennas and Propagation 56(7):1888-1899 (2008).

Wang, et al., "Rotating-element electric-field vector(REV) calibration method based on power measurement for phased array antenna," 2017 International Applied Computational Electromagnetics Society Symposium (ACES), 2017, pp. 1-2.

Yang, et al, A fast calibration method for phased arrays by using the graph coloring theory, Sensors 18:4315 (2018) doi:10.3390/s18124315.

* cited by examiner

APPARATUS AND METHOD FOR PROVIDING PROBABILISTIC ADDITIVE GAIN, CALIBRATION, AND LINEARIZATION IN A PHASED ARRAY USING SINGLE BIT SOURCES

CROSS-REFERENCE TO RELATED APPLICATION

This application is a continuation of U.S. patent application Ser. No. 16/995,696, filed Aug. 17, 2020, and issued as U.S. Pat. No. 11,158,942, which claims priority to U.S. Provisional Patent Application No. 62/910,235, filed Oct. 3, 2019, the entire contents of each of which are incorporated herein by reference.

FIELD OF THE INVENTION

This invention relates generally to Radio Frequency (RF) signal processing. More particularly, this invention is directed toward techniques for providing probabilistic additive gain, calibration and linearization in a phased array using single bit sources.

BACKGROUND OF THE INVENTION

RF signal processing circuitry typically includes RF mixers, RF attenuators, extra RF gain stages and multiple bit Analog-to-Digital Converters (ADCs). This commonly results in expensive, bulky and power-hungry circuitry.

Thus, there is a need for improved RF signal processing circuitry.

SUMMARY OF THE INVENTION

An array of antennae includes a monobit transmitter to insert dither into a transmit signal to form a dithered transmit signal. Monobit receivers process received signals that are combined with the dithered transmit signal to form composite received signals. Digital down converters process the composite received signals to form down converted received signals. A beamformer circuit processes the down converted received signals to form recovered signals.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Disclosed are RF receiver circuits and systems to provide signal conditioning, calibration, linearization, and digitization of an RF signal by using a single bit digital transmitter and network of single bit digital receivers. Using this single bit network enables a very compact phased array system. A single bit direct digitizer instead of RF frequency converter and a multi-bit analog-to-digital converter (ADC) results in significantly reduced size, weight, and power (SWAP) for RF receiver systems. In antenna array systems, where a digitizer is required to digitize the signal from each antenna, where tens of thousands antenna elements are needed, the SWAP advantage is quite significant.

Tunable dither noise is introduced in a monobit transmitter, which produces three favorable results. First, the tunable dither noise linearizes the RF signal. Second, by controlling amplitude levels of dither noise, "probabilistic" gain control of the RF signal is obtained. Third, the dither noise serves as a calibration signal to synchronize multiple receivers.

Monobit transceivers also run at much faster clock speeds than a multi-bit ADC because multiple bits are not synchronized. So, a monobit approach enables direct digitization of RF signals with no down conversion and down mixing of the RF signal to another intermediate frequency (IF). This approach enables elimination of RF mixers, RF attenuators and extra RF gain stages normally present in RF chains, as well as the reduction to a single monobit receiver instead of the standard multi-bit ADC. This facilitates RF receivers with ultra-compact size, low weight and low power enabling many novel, small form factor terrestrial and space-based applications.

Figure 1:
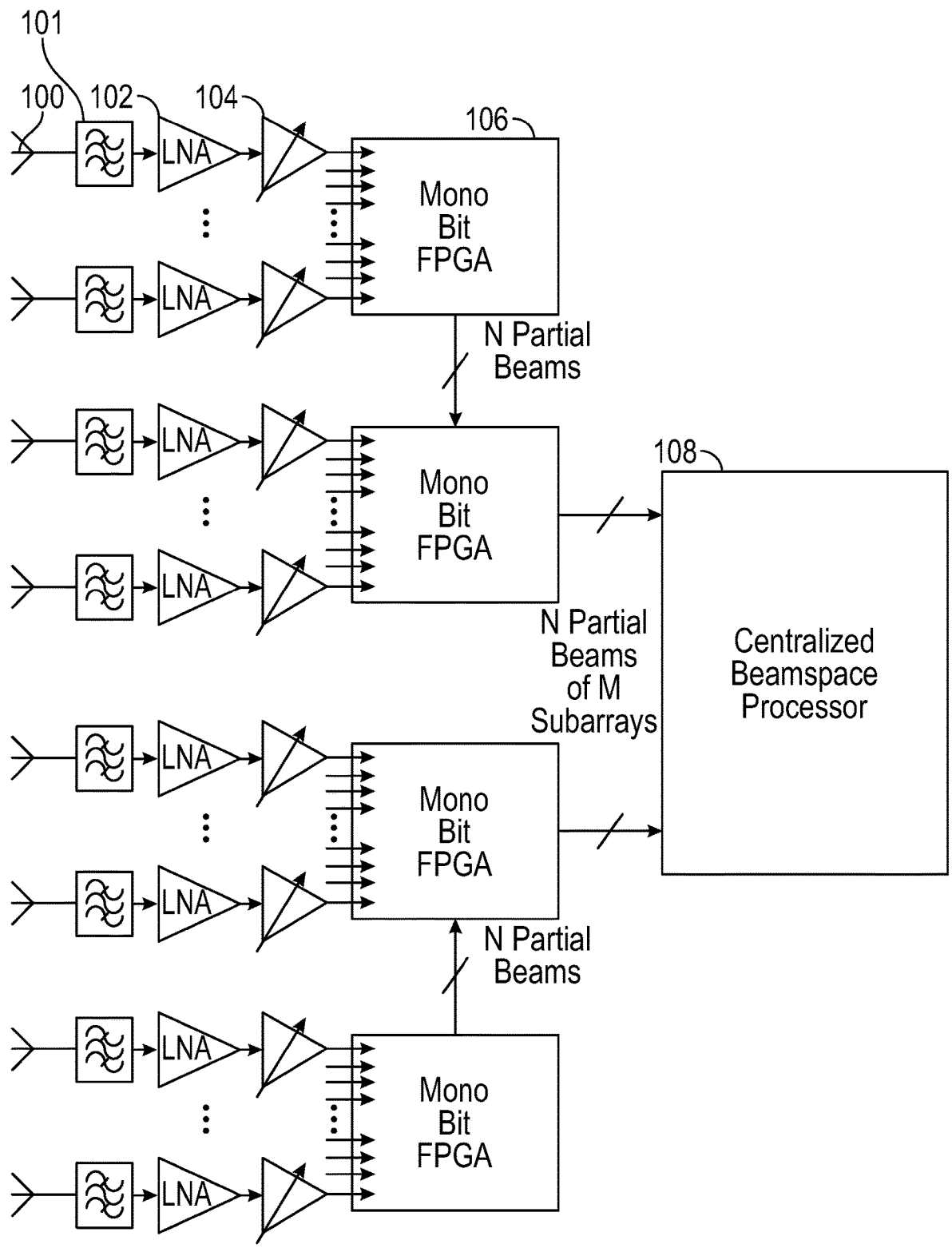
FIG. 1 is a block diagram of a monobit receiver antenna array configured in accordance with an embodiment of the invention.

FIG. 1 is a block diagram of a monobit antenna array system for a receive only system. One of the preferred embodiments of monobit is a phased array receiver for satellite communications (SATCOM). Note the absence of explicit ADC components, as these are replaced by the transceiver monobits.

FIG. 1 shows an antenna 100, a bandpass filter 101, a low noise amplifier (LNA) 102 and an automatic gain control circuit 104. Typically, a LNA is required on the front end of the system, which drives down the total noise figure of the RF chain. Considerable RF gain is desirable in a monobit receiver because of the high quantization noise associated with a single bit. A bandpass filter is also desired to mitigate out of band spurs from being digitized by the monobit digitizer 106, which may be implemented with a Field Programmable Gate Array (FPGA) Serializer/Deserializer (SERDES) with Input/Output (TO) pins. Partial beams from individual monobit digitizers 106 are fed to a centralized beamspace processor 108.

Figure 2:
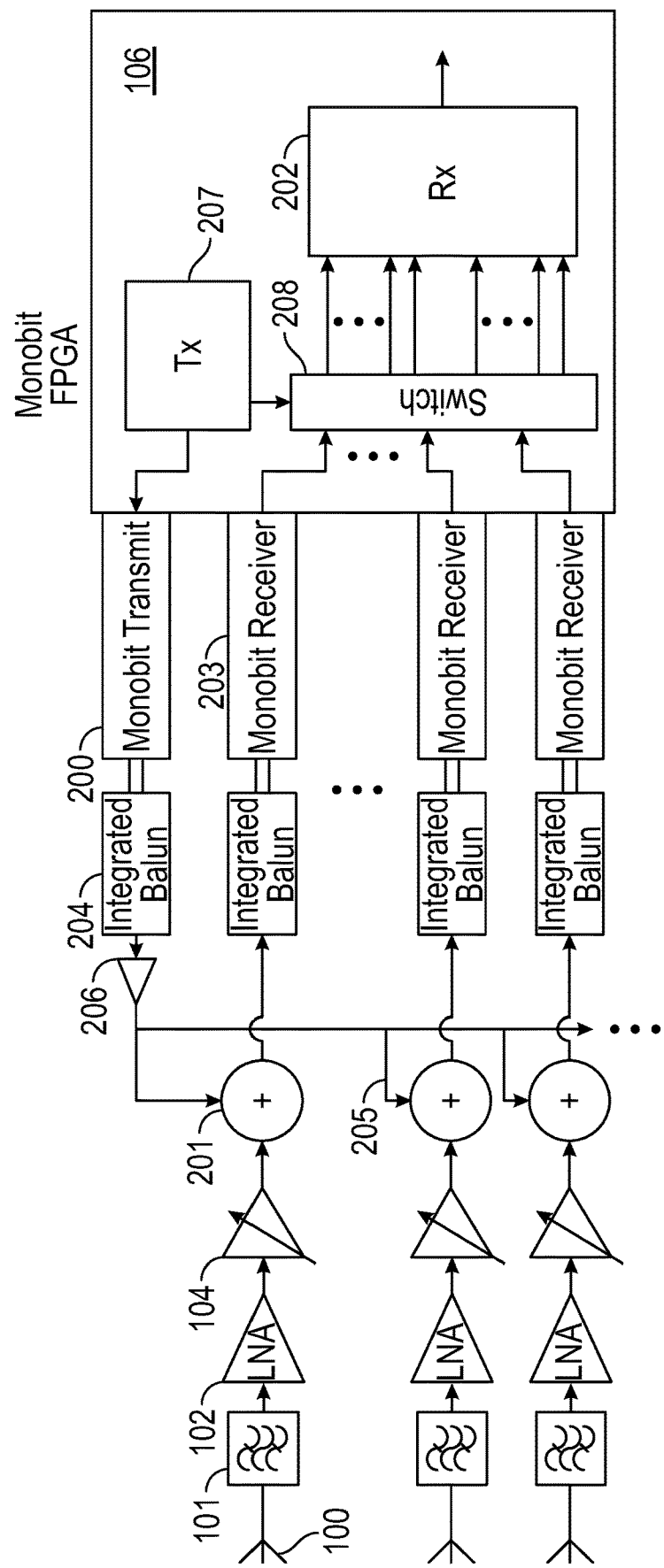
FIG. 2 illustrates a dither inserting monobit antenna array configured in accordance with an embodiment of the invention.

FIG. 2 illustrates a monobit antenna array system that adds dither. Dither is an intentionally applied form of noise. A monobit transmitter 200 creates the dither. The dither is added to the received signal at power combiner 201. An integrated balun (a contraction of balanced-unbalanced) 204 receives a differential balanced input and produces an unbalanced single-ended output, which may be amplified with amplifier 206. An automatic gain control component can be used to further control the amplitude of the dither.

The dither has the beneficial effect of adding gain to the signal at mixer 201; it is also helpful because the noise dither is digitally created with a transit monobit 200 and all the combining is done on a compact printed circuit board.

After digitization through a monobit, a receive algorithm circuit 202 is used to pull the monobit signal out of noise using signal processing techniques.

In order to create a linear signal with no spurs during the monobit digitization process, the dither noise power must be greater than the received signal power level, creating a negative signal to noise and dither ratio (SNDR). The automatic gain control component allows further control the SNDR.

A monobit receiver circuit 203 serves as the analog to digital converter. In one embodiment, the monobit receiver circuit 203 is the built-in transceiver element for a field programmable gate array (FPGA), which has a differential input.

The balun circuit 204 is integrated with the transceiver element 200. In one embodiment, the balun circuit 204 is physically connected as the same circuit to the transceiver element 200, since any line length between the balun 204 and monobit transceiver 200 distorts the signal.

Node 205 shows a split of the transport port, such that the monobit transmitter signal is split to all the summers going into the monobit receivers 203. The same transmit signal is routed and split to all the receivers such that all the receivers can see the same signal. In this way, the transmitter port is also used to send a calibration signal to all the receivers. Using the transmitter for calibration is a critical operation to the timing alignment of the system.

The transmitter circuit 207 controls the waveform sent out, the power of the waveform sent out, whether the waveform is dither, or a calibration tone, or both, and the control to the switch 208. This is what controls the gain, and whether a calibration tone is present.

Switch 208 toggles the received signals between the real time receive circuit 202 and a calibration processor. In one embodiment, the monobit received signals are sent to memory, and the switch is implemented as a memory controller where the signals are sent to the receive circuit 202.

The transmission circuit 207 includes a calibration algorithm invoked on power up to time align the monobit channels, as discussed below.

Figure 3:
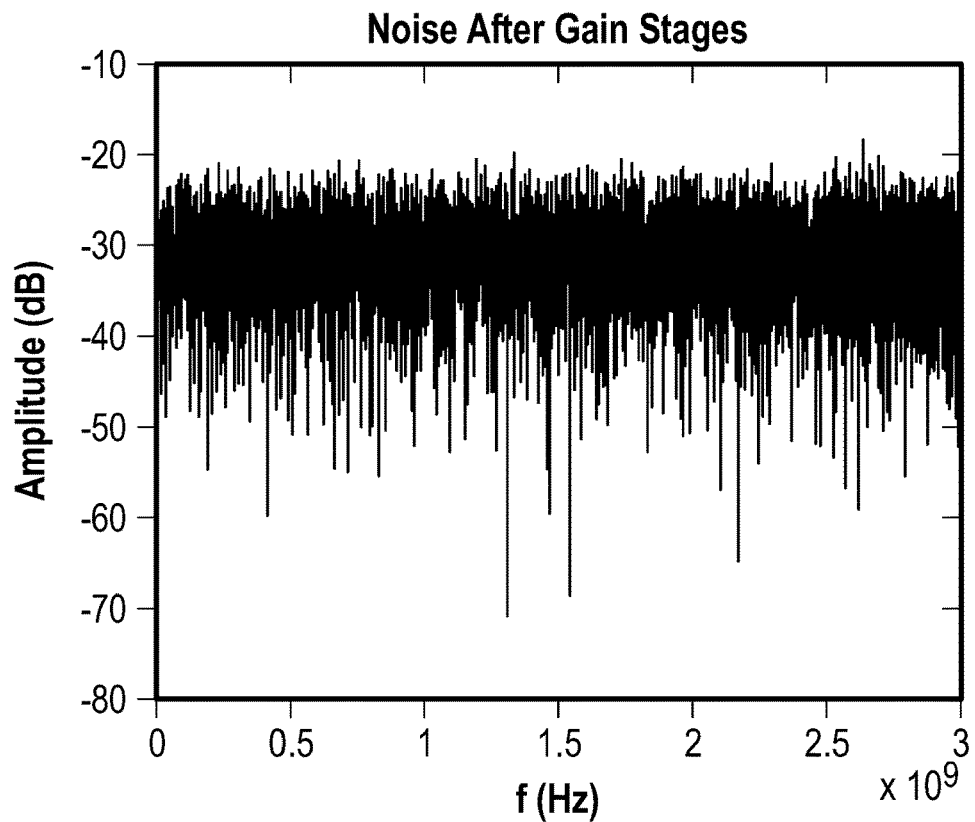
FIG. 3 shows the spectrum of a signal after dither is added in, but before digitization and signal processing.

FIG. 3 shows the spectrum of the signal after dither is added, but before digitization and signal processing at mixer 201. A negative signal to noise and dither ratio (SNDR) signal is created such that the signal is indistinguishable from noise, the spectrum for the signal is shown in FIG. 3.

Figure 4:
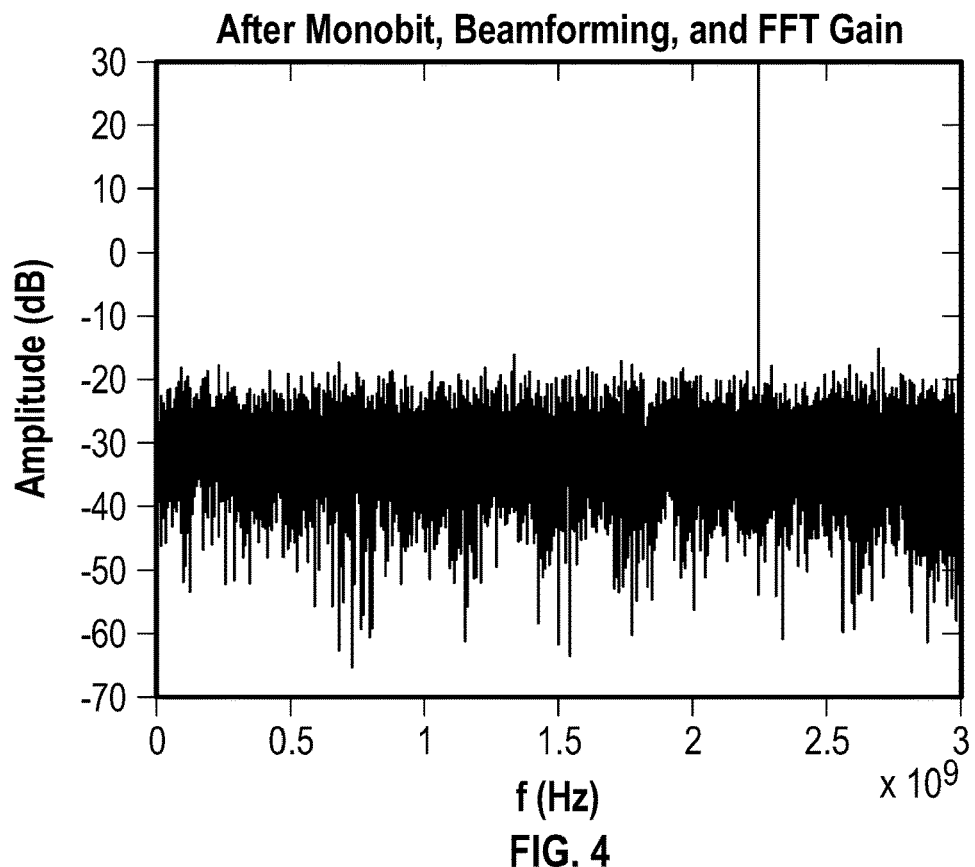
FIG. 4 shows a signal recovered in accordance with an embodiment of the invention.

FIG. 4 shows the result after processing by the receive circuit 202. FIG. 4 shows the representative signal when receiving a single tone through the monobit receiver after the receive circuit 202 is used to bring the signal out of the noise. Note the large dynamic range (amplitude difference between the peak of the signal and the noise floor) in FIG. 4, demonstrating the linearizing nature of the dither on the single bit receiver. The monobits run at a rate of up to 28 Gbps in one embodiment.

Figure 5:
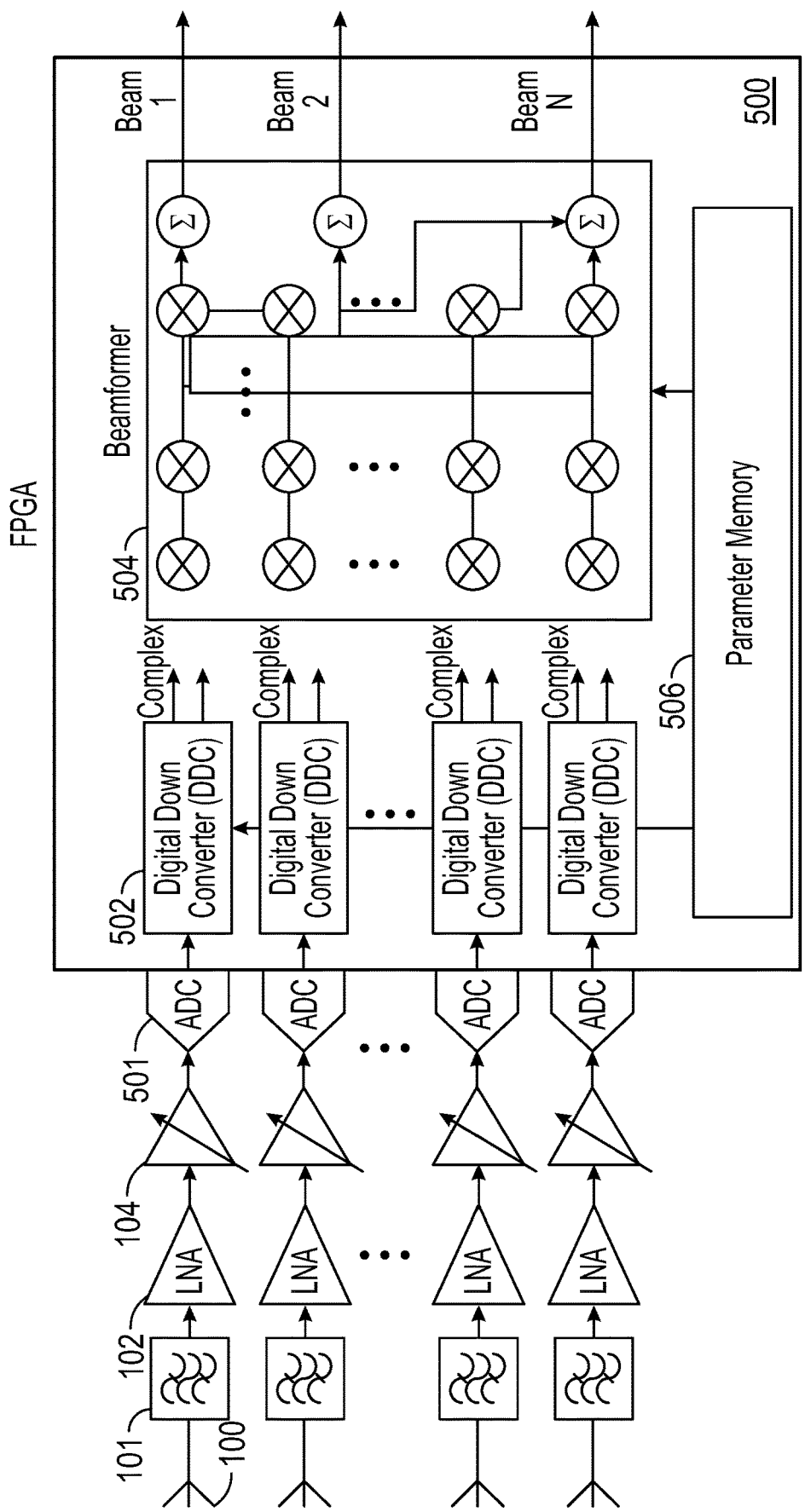
FIG. 5 shows a digital beamforming and down conversion network employed by a receive algorithm circuit disclosed in accordance with an embodiment of the invention.

FIG. 5 shows the digital beamforming and down conversion network 500 used as the real time receiver network to bring the received signal out of the noise. FIG. 5 is a FPGA based embodiment of the receive circuit 202.

In FIG. 5 the signal is received at each of the antenna element 100 whose spatial position is saved into the parameter memory 506. The signal's phase changes due to the direction of arrival to each element in the antenna element array. These phase changes are derived and saved into the parameter memory 506.

In each of the receiver chains, the signal is applied to a bandpass filter 101 and then amplified with a Low Noise Amplifier (LNA) 102. After the LNA 102, a variable gain amplifier 104 is used to amplify the received signal to the appropriate level for the Analog-to-Digital Converter (ADC) 501 to accurately capture the signal. The ADC 501 samples the signal at a rate that will capture the bandlimited signal, which is then transferred to the Digital Down Converter (DDC) 502. The sample signal entering the DDC 502 is quantized time-sample data. The DDC 502 converts the quantized time-sampled signal to a lower Intermediate Frequency (IF) complex sampled data using the parameter memory 506. Then the beamformer 504 applies a unique complex phase shift, found in the parameter memory 506 to each channel from each antenna element. These complex phase shifts focus the antenna element channels into a specific beam position. Beam positions are designated as Beams 1 through N. The application of unique complex phase shifts from parameter memory 506 is replicated for each of the N beams. The complex data in each of the N beams is now beamformed in an angular direction from the center of the antenna element array.

The ADC 501 is used for the monobit transceiver. The DDC 502 and beamformer 504 implement receive signal processing. In one embodiment, a Virtex Ultrascale+FPGA transceiver is used. It runs at up to 32 gigabits per second (gbps), each monobit ADC takes in 32 gbps, or up to 16 GHz of bandwidth. Most signals are typically no more than 20 MHz wide, so the digital down converter digitizes the 20 MHz of bandwidth. In signal processing noise floor is commensurate with bandwidth, so the DDC 502 operation going from 16 GHz to 20 MHz, reduces the noise by 30 dB, or equivalently increases the SNR by 30 dB.

All signals coming from the monobit elements are beamformed. Beamforming is equivalent to phase shifting, by applying a complex multiply operation, and then summing. The output of the DDC element produces complex data, in-phase and quadrature signals. Each monobit goes into a DDC and then each DDC output from each monobit goes into a complex multiple per beam angle. In this way, many beam directions are assessed simultaneously.

Figure 6:
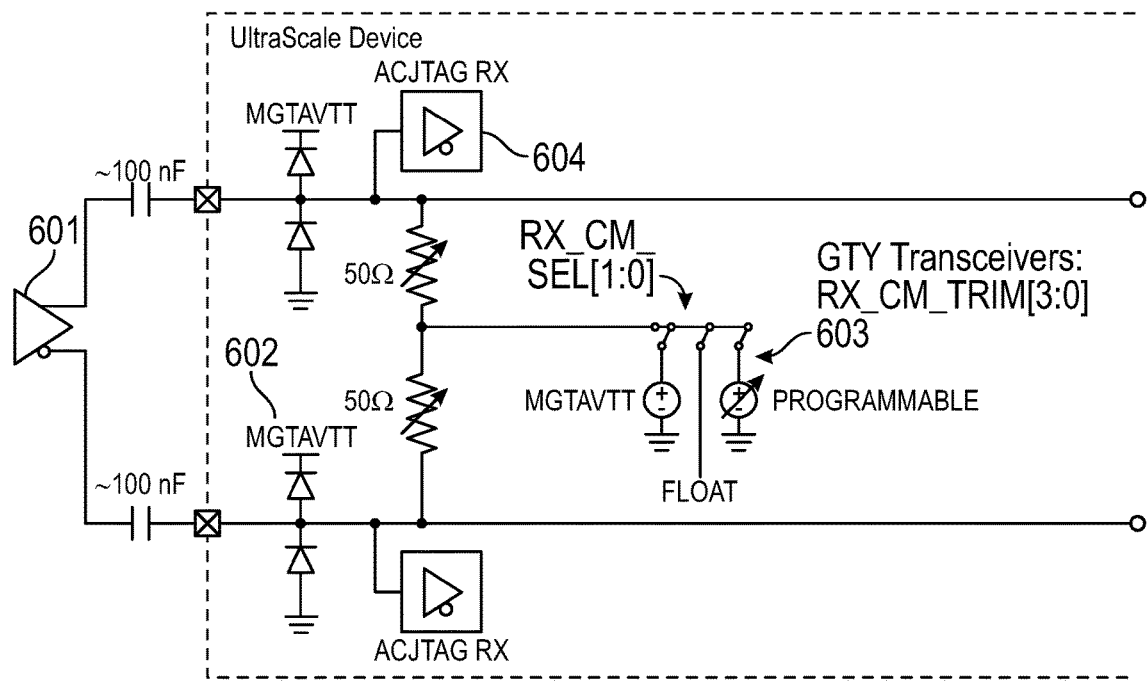
FIG. 6 illustrates a monobit receiver configured in accordance with an embodiment of the invention.

FIG. 6 shows the low-level circuit details of the monobit receiver 203 from FIG. 2. FIG. 6 shows the analog front end of a single monobit receiver. A differential mode input buffer amp 601 serves as the very first element in the monobit receive chain. Two RF capacitors of 100 nF connect the signal to voltage regulation circuitry 602. MGTAVTT is the MGT voltage level that is programmable. Switches 603 set the programmable voltage level. The input at the far left of FIG. 6 is the differential input. Each clocked input signal is brought to a stable voltage corresponding to a logic level '1' or '0' with this circuit, and thus the input RF signal becomes digitized. A JTAG test output port 604 facilitates the testing of voltage levels. Utilizing FPGA SERDES Data Transceiver circuits as individual RF receivers greatly reduces additional exterior circuitry, enabling smaller form-factor applications.

Figure 7:
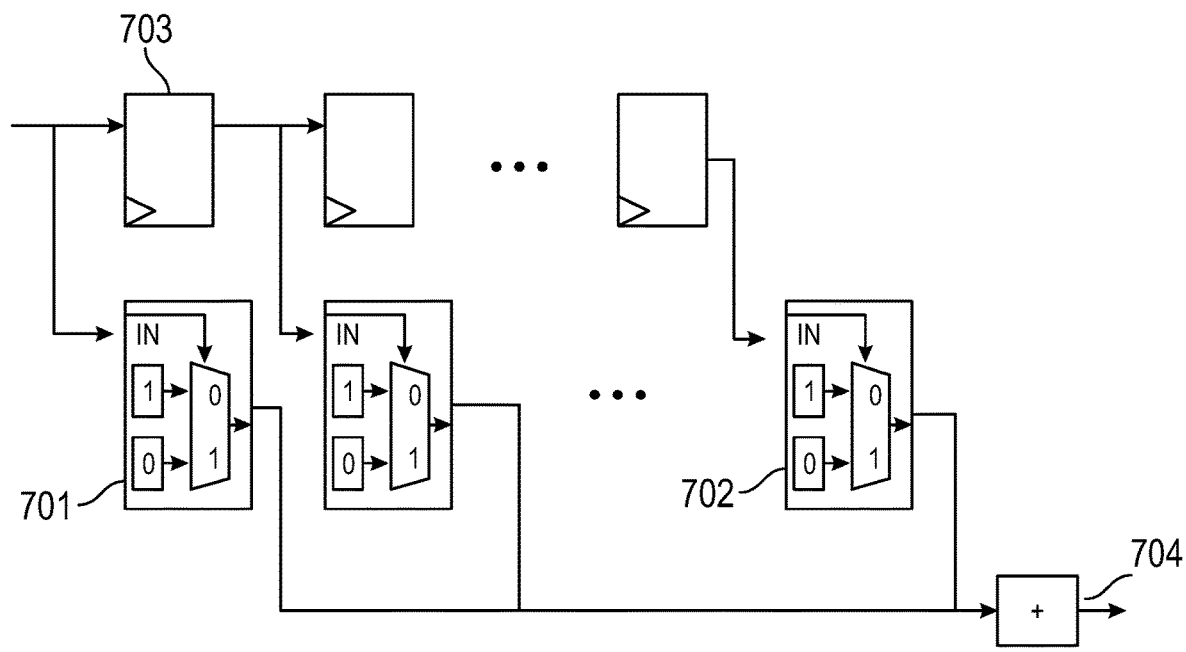
FIG. 7 illustrates a digital down converter utilized in accordance with an embodiment of the invention.

FIG. 7 shows a unique implementation of the DDC 502 from FIG. 5. DDCs are implemented with a finite impulse response (FIR) filter. A FIR filter is normally implemented with a multiplier and summing circuit, but with a monobit input, a multiplication is implemented with a multiplexer 701 operative to invert the input signal. Multiplexer 702 passes the monobit input through without inversion. Multiplexers can be reprogrammed to either configuration and in this way filter weights are set for each of the multiplexers. Node 703 is the input to the circuit. Node 704 is the output of the summer. Each multiplexer output is applied to an adder and the result of the sum is relayed on node 704. The main advantage of this implementation is greatly reduced resource usage to implement the receiver processing due to the nature of implementing single bit mathematics in a multiplexer instead of a multiplier. Multipliers are typically scarce in mid to low range FPGA devices. The use of a multiplexer to implement the multiplication operations of DDC and FIR circuitry greatly reduces the resource use of multipliers allowing for less expensive FPGA devices to be used in SATCOM applications.

Figure 8:
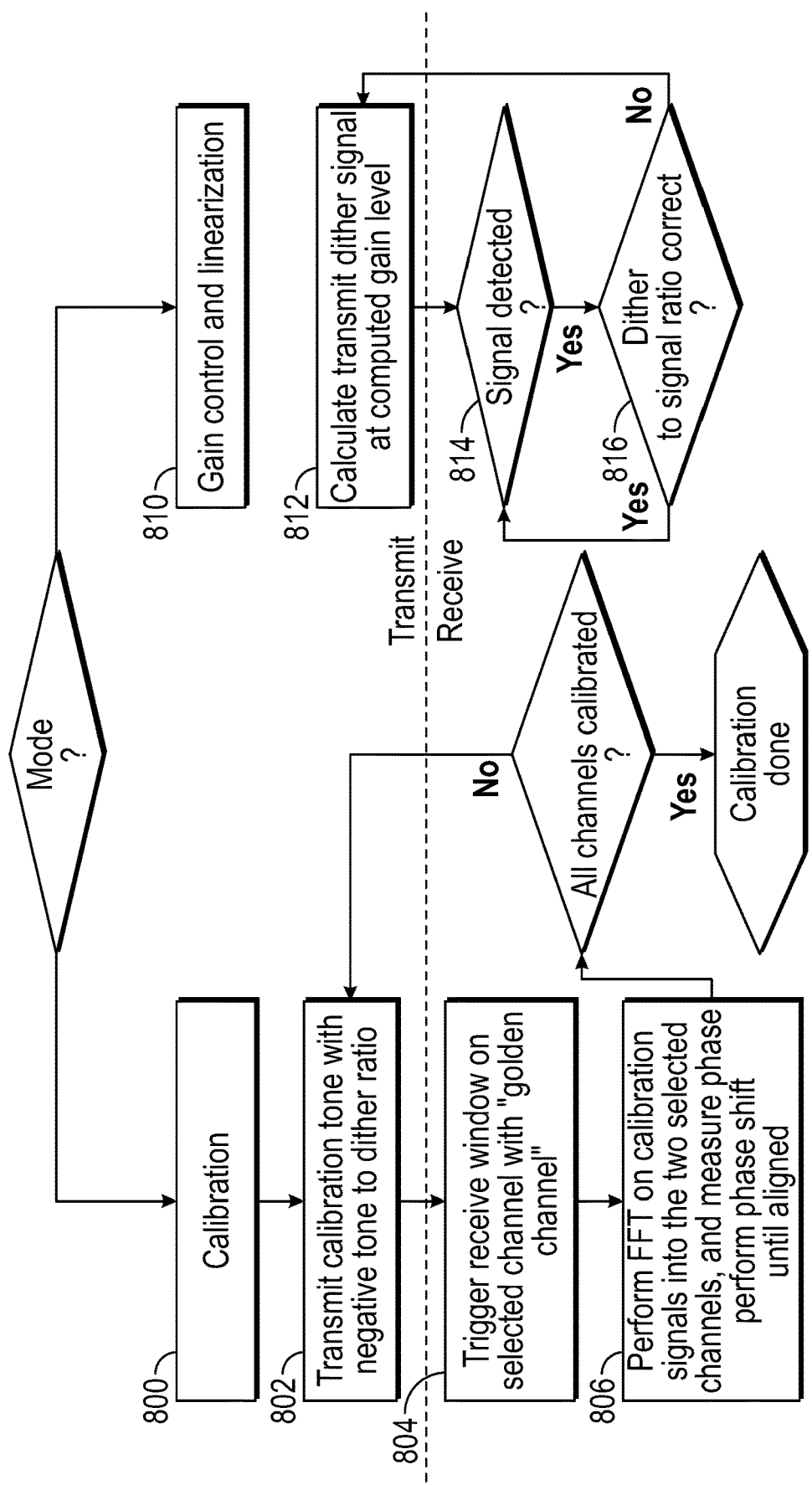
FIG. 8 illustrates transmit and receive operations performed in accordance with an embodiment of the invention.

The top portion of FIG. 8 shows transmit processing executed by the transmit circuit 207. The receiver processing implemented by the receive circuit 202 is shown in the bottom portion of FIG. 8.

First a master controller chooses the mode of the transmitter, whether it needs to calibrate and synchronize all the receive channels or provide the probabilistic gain and linearization of the monobits.

In calibration mode 800, a calibration tone is added to some dither 802, because a negative signal to dither ratio is required to get a clear signal. The calibration tone is then transmitted to all the receiver channels. One receiver channel is selected as the "golden channel" for all other channels to be compared 804. One by one, the phase of the calibration signal is compared (e.g., using a Fast Fourier Transform or FFT) in the current channel to the golden channel, and then phase shifted such that the current channel is phase aligned with the golden channel 806. This is done until all channels are calibrated.

In gain control and linearization mode 810, at first, a pre-set probabilistic gain (noisy) signal is sent to all channels at a very low level 812, almost zero dither at first so as not to miss a sensitive signal that may be right at the sensitivity of the receiver. The FFT algorithm is run and if a signal is detected 814, the dither to signal ratio is calculated 816. If any signals are detected that were above the noise and dither, these signals are clearly too strong, and the dither must be increased to create a negative signal to dither ratio. The dither is increased in the gain and linearization transmitter and the signal is detected again. If the dither to signal ratio is correct, the algorithm goes into normal detection mode and proceeds with the rest of the receive processing. The algorithm constantly iterates to make sure the dither ratio is correct.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A radio-frequency (RF) system comprising:
    an antenna configured to receive an RF signal;
    a transmitter configured to generate a variable dither signal with an amplitude such that a power of the variable dither signal is greater than a power of the RF signal;
    a gain controller configured to control an amplitude of the variable dither signal;
    a power combiner configured to combine the variable dither signal and the RF signal;
    a receiver configured to digitize an output of the power combiner and output a signal; and
    an electronic circuitry configured to process the signal from the receiver.

2. The RF system of claim 1, wherein the transmitter comprises a digital circuitry configured to digitally generate the variable dither signal.

3. The RF system of claim 2, wherein the transmitter further comprises:
    a digital to analog converter (DAC) configured to receive the variable dither signal; and
    a balun configured to receive a differential balanced input from the DAC and produce an unbalanced single ended output.

4. The RF system of claim 1, wherein the transmitter comprises a monobit transmitter.

5. The RF system of claim 1, wherein the gain controller comprises an automatic gain controller.

6. The RF system of claim 1, wherein the receiver comprises a monobit receiver.

7. The RF system of claim 1, wherein the receiver comprises an analog to digital converter (ADC).

8. The RF system of claim 1, further comprising a balun configured to receive output of the power combiner and provide a balanced output to the electronic circuitry.

9. The RF system of claim 1, further comprising a switch configured to toggle between a first path connecting the receiver to the electronic circuitry and a second path connecting the transmitter to the electronic circuitry.

10. A radio-frequency (RF) system comprising:
    an antenna configured to receive an RF signal;
    a transmitter configured to generate a variable dither signal;
    a gain controller configured to control an amplitude of the variable dither signal;
    a power combiner configured to combine the variable dither signal and the RF signal;
    a receiver configured to digitize an output of the power combiner and output a signal; and
    an electronic circuitry configured to process the signal from the receiver, the electronic circuitry comprising:
        a digital down converter (DDC); and
        a digital beamformer.

11. The RF system of claim 10, wherein the digital beamformer is configured to apply a complex phase shift to a signal output from the digital down converter.

12. The RF system of claim 11, wherein the digital beamformer is configured to apply the complex phase shift by applying a complex multiplication and a summation.

13. The RF system of claim 10, further comprising a balun configured to receive output of the power combiner and provide a balanced output to the electronic circuitry.

14. The RF system of claim 10, further comprising a switch configured to toggle between a first path connecting the receiver to the electronic circuitry and a second path connecting the transmitter to the electronic circuitry.

15. A radio-frequency (RF) system comprising:
an array of antennae;
an array of receivers, a receiver of the array of the receivers configured to digitize an RF signal received by a corresponding antenna of the array of antennae; and
a receiver electronics configured to process signals from the array of receivers, the receiver electronics comprising:
an array of digital down converters (DDCs); and
a digital beamformer configured to apply a complex phase shift to a signal output by the array of digital down converters.

16. The RF system of claim 15, wherein at least one receiver of the array of receivers comprises a monobit receiver.

17. The RF system of claim 15, wherein at least one receiver of the array of receivers comprises an analog to digital converter (ADC).

18. The RF system of claim 15, wherein the digital beamformer is configured to apply the complex phase shift by applying a complex multiplication and a summation.

19. The RF system of claim 15, wherein the receiver electronics comprises a memory configured to store spatial position of the array of antennae.

20. The RF system of claim 15, further comprising:
an array of transmitters configured to generate a plurality of variable dither signals;
an array of gain controllers configured to control an amplitude of the plurality of variable dither signals; and
an array of power combiners configured to combine a plurality of RF signals with a plurality of variable dither signal, a power combiner of the array of power combiners corresponding to a receiver of the array of the receivers configured to combine a variable dither signal from the plurality of variable dither signals with the RF signal received by the corresponding antenna of the array of antennae, wherein an output from the power combiner is provided to the receiver of the array of receivers.

* * * * *

UNITED STATES PATENT AND TRADEMARK OFFICE
CERTIFICATE OF CORRECTION

PATENT NO. : 11,588,239 B2
APPLICATION NO. : 17/510086
DATED : February 21, 2023
INVENTOR(S) : Alexander Paul Scott It is certified that error appears in the above-identified patent and that said Letters Patent is hereby corrected as shown below:

In the Specification

Column 2, Line 56, delete "(TO)" and insert -- (I/O) --.

Column 4, Line 28, delete "Ultrascale+FPGA" and insert -- Ultrascale+ FPGA --.

Signed and Sealed this
Thirteenth Day of June, 2023

Katherine Kelly Vidal
*Director of the United States Patent and Trademark Office*